(12) United States Patent
Jones et al.

(10) Patent No.: US 7,854,395 B1
(45) Date of Patent: Dec. 21, 2010

(54) ROCKET COMBUSTION CHAMBER WITH JACKET

(75) Inventors: Douglas B. Jones, Mojave, CA (US); Jeffrey K. Greason, Tehachapi, CA (US); Daniel L. DeLong, Mojave, CA (US)

(73) Assignee: Xcor Aerospace, Mojave, CA (US)

( * ) Notice: Subject to any disclaimer, the term of this patent is extended or adjusted under 35 U.S.C. 154(b) by 367 days.

(21) Appl. No.: 12/029,345

(22) Filed: Feb. 11, 2008

(51) Int. Cl.
*B64D 33/04* (2006.01)

(52) U.S. Cl. ..................... 239/127.1; 60/267
(58) Field of Classification Search ............ 60/267, 60/730; 239/127.1
See application file for complete search history.

(56) References Cited

U.S. PATENT DOCUMENTS

| | | | | |
|---|---|---|---|---|
| 2,686,400 A | * | 8/1954 | Andrus | 60/260 |
| 3,251,553 A | * | 5/1966 | Fitton et al. | 239/127.3 |
| 3,613,207 A | * | 10/1971 | Malburg | 29/890.01 |
| 5,048,289 A | * | 9/1991 | Brown | 60/267 |
| 5,386,628 A | * | 2/1995 | Hartman et al. | 29/890.01 |
| 5,701,670 A | * | 12/1997 | Fisher et al. | 29/890.01 |
| 6,829,884 B2 | | 12/2004 | Fint et al. | |
| 2005/0086945 A1 | * | 4/2005 | Tiemann | 60/800 |

OTHER PUBLICATIONS

SPL Swiss Propulsion Laboratory; "Our Products and Services"; http://www.spl.ch/products/index.html; 11 pp.

* cited by examiner

*Primary Examiner*—William H Rodriguez
*Assistant Examiner*—Phutthiwat Wongwian
(74) *Attorney, Agent, or Firm*—Christie, Parker & Hale LLP

(57) ABSTRACT

The present invention relates to rocket engine combustion chambers, and more particularly to an improved rocket engine combustion chamber having a jacket. In some embodiments, a combustion system for a rocket engine includes an injector, a cylindrical combustion chamber, and a jacket coupled to the combustion chamber and to the injector. The combustion chamber can expand axially and/or radially with respect to the jacket. The outer surface of the combustion chamber includes a plurality of flow channels. One or more piston seals and/or bellows can be included to allow axial expansion of the combustion chamber with respect to the jacket. A gap formed between the inner surface of the jacket and the outer surface of the combustion chamber allows for radial expansion of the combustion chamber with respect to the jacket.

13 Claims, 5 Drawing Sheets

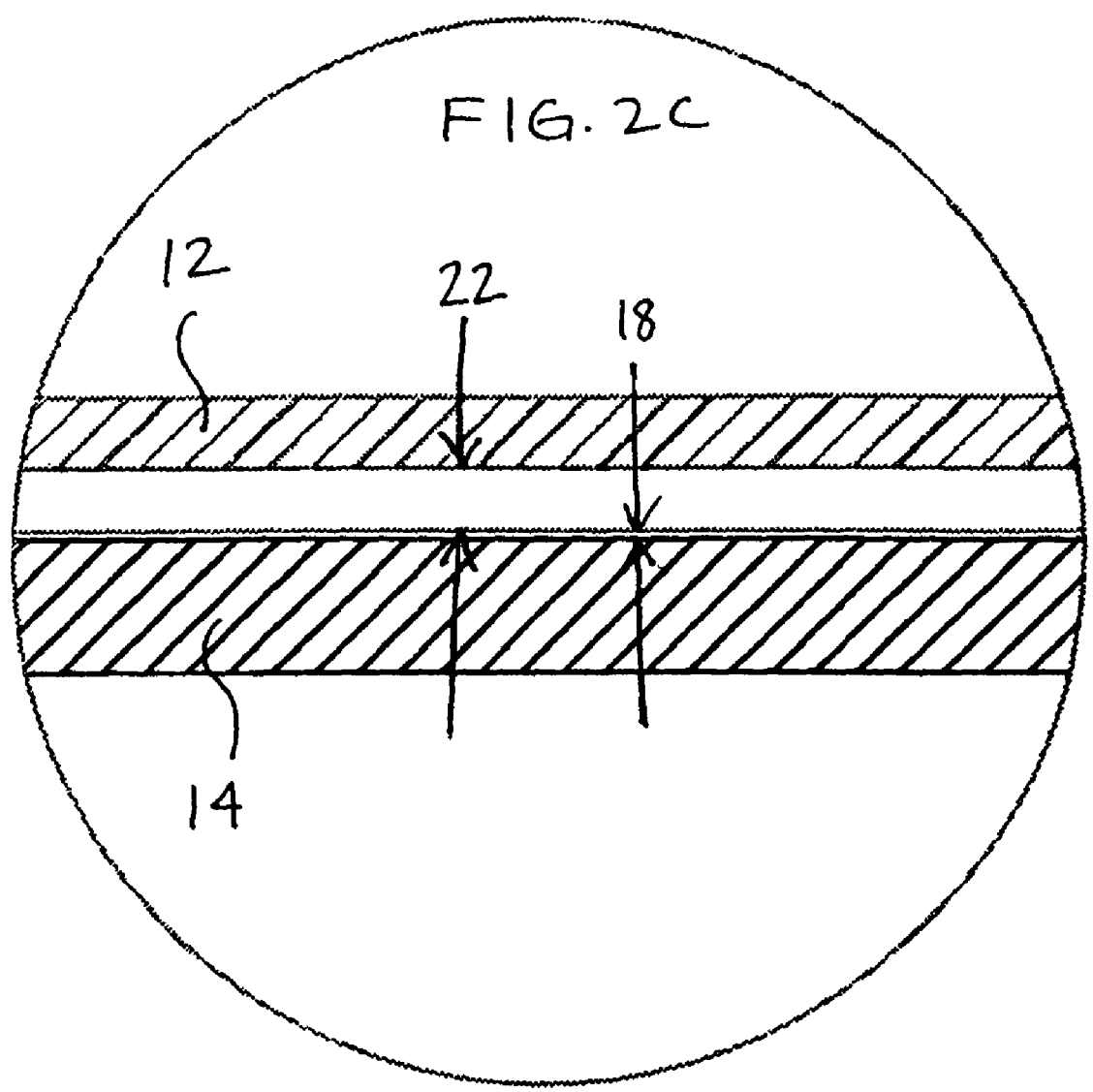

ROCKET COMBUSTION CHAMBER WITH JACKET

FIELD OF THE INVENTION

The present invention relates to rocket engine combustion chambers, and more particularly to an improved rocket engine combustion chamber having a jacket.

BACKGROUND

The combustion chamber of a rocket engine reaches very high temperatures as the rocket engine's propellants are ignited and burned inside the chamber and the burned gases are expelled through the rocket engine nozzle. The temperature of the burning propellants inside the combustion chamber is normally well above the temperature at which the combustion chamber would melt. Accordingly, rocket engines must be cooled during operation of the engine in order to preserve the combustion chamber.

Typically rocket engines utilize regenerative cooling to cool the combustion chamber. In an engine with regenerative cooling, at least one of the propellants is circulated through the walls of the combustion chamber before it is injected into the combustion chamber to be ignited. The circulating propellants absorb heat from the walls of the combustion chamber, cooling the combustion chamber to a suitable temperature. This cooling is termed "regenerative" because the heat energy absorbed by the propellants is not lost; rather, the heated propellants recycle the heat energy into the combustion chamber when they are injected into the chamber to be burned.

In order to introduce regenerative cooling into the walls of a combustion chamber, combustion chambers can be constructed with an inner wall and an outer wall bonded together. The inner wall forms the inside of the combustion chamber. The propellants circulate through a series of flow passages or grooves formed between the inner and outer walls. However, the inner wall reaches a higher temperature than the outer wall, as the inner wall is closer to the high heat inside the combustion chamber. As a result, the thermal expansions of the two walls differ, with one expanding more than the other. Therefore, the combustion chamber experiences high thermal stresses and thermal cyclic fatigue which can ultimately cause failure of the combustion chamber. Accordingly, it is desirable to provide a rocket engine combustion chamber that utilizes regenerative cooling while reducing thermal stresses in the combustion chamber.

SUMMARY

The present invention relates to rocket engine combustion chambers, and more particularly to an improved rocket engine combustion chamber having a jacket. In some embodiments, a combustion system for a rocket engine includes an injector, a cylindrical combustion chamber, a jacket coupled to the combustion chamber and to the injector, and means for allowing radial expansion of the combustion chamber with respect to the jacket.

In other embodiments of the invention, a combustion system for a rocket engine includes an injector, a cylindrical combustion chamber, a jacket coupled to the combustion chamber and to the injector, and means for allowing axial expansion of the combustion chamber with respect to the jacket.

In other embodiments of the invention, a combustion system for a rocket engine includes an injector, a combustion chamber having a first end and a second end, and a jacket surrounding the combustion chamber. The jacket has a first end coupled to the injector. The jacket forms a gap between an outer surface of the combustion chamber and an inner surface of the jacket, and at least one of the first and second ends of the combustion chamber is configured to expand with respect to the jacket.

In other embodiments of the invention, a rocket engine includes a combustion chamber having an inner surface and an outer surface, a plurality of flow passages in the outer surface of the combustion chamber, a jacket encircling the combustion chamber, the jacket having an inner surface and an outer surface and forming a gap between the inner surface of the jacket and the outer surface of the combustion chamber, a clamp clamping a first end of the jacket to a first end of the combustion chamber, and a piston seal coupling a second end of the jacket to a second end of the combustion chamber. The piston seal is configured to allow movement between the second end of the jacket and the second end of the combustion chamber, and the gap is configured to close during operation of the rocket engine.

BRIEF DESCRIPTION OF THE DRAWINGS

FIG. 2C is an enlarged view of a portion of the combustion chamber and cooling jacket of FIG. 1;

To aid the reader, the thickness and/or other dimensions of the combustion chamber, cooling jacket, gap, and other features are exaggerated in some of the figures, and the relative dimensions are not necessarily drawn to scale.

DETAILED DESCRIPTION

Figure 1:
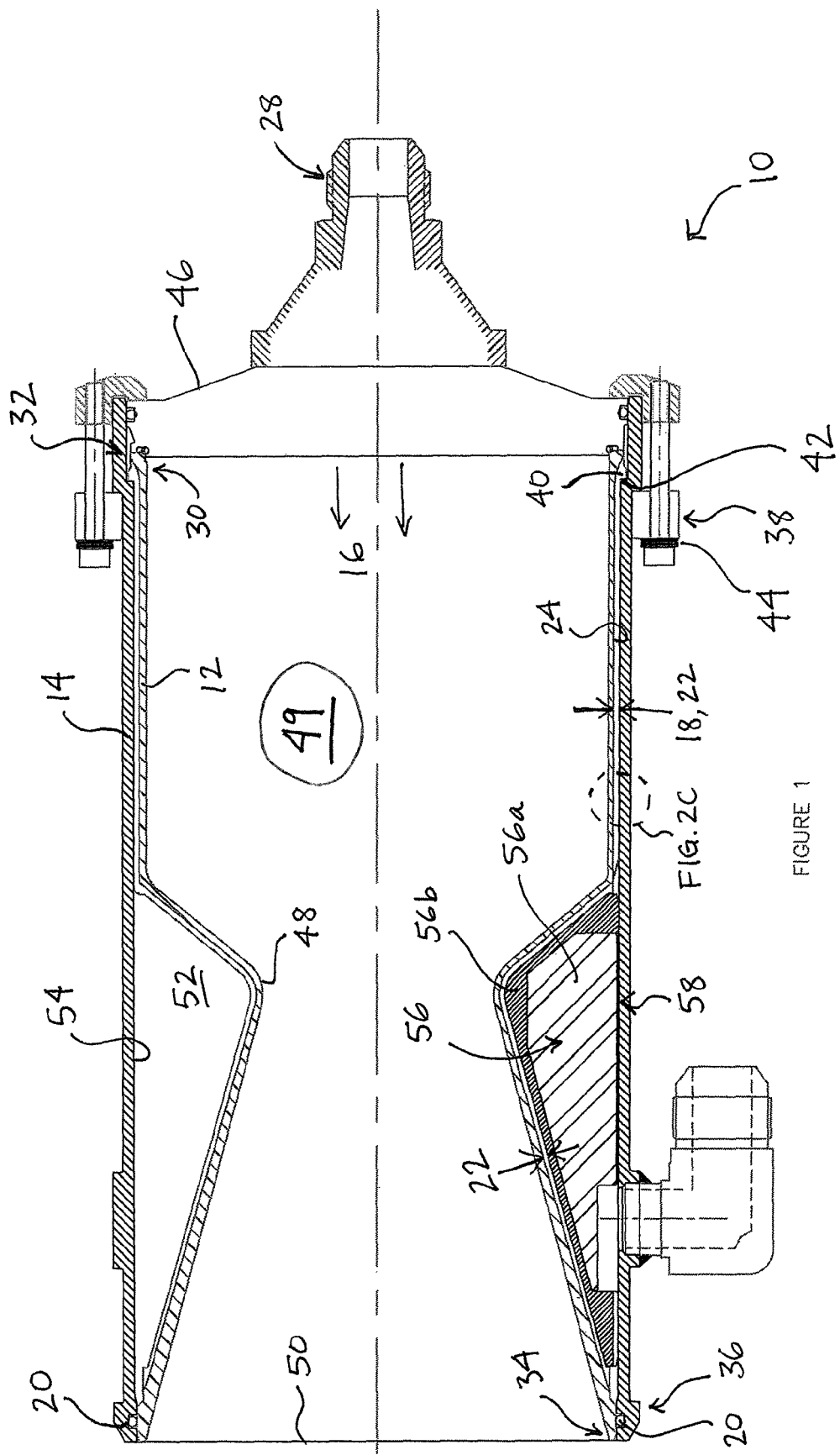
FIG. 1 is a cross-sectional side view of a combustion system, according to some exemplary embodiments of the invention, taken along the line 1-1 shown in FIG. 2A.

The present invention is directed to rocket engine combustion chambers, and more particularly to an improved rocket engine combustion chamber having a jacket. A combustion system 10, according to some exemplary embodiments of the invention, is shown in FIG. 1. The combustion system 10 includes a combustion chamber 12 and a cooling jacket 14. The combustion chamber 12 reaches a higher temperature than the cooling jacket 14 during operation of the rocket engine, because the burning propellants 16 generate a high temperature inside the combustion chamber 12. A gap 18 (shown enlarged in FIG. 2C) between the combustion chamber 12 and cooling jacket 14 allows the combustion chamber 12 to expand radially before it is constrained or obstructed by the cooling jacket 14. The combustion chamber 12 is also free to move axially with respect to the cooling jacket 14, as the two are coupled together by a piston seal 20 that allows axial movement. The piston seal 20 and gap 18 allow thermal expansion of the combustion chamber 12 and thereby reduce the thermal stresses in both the combustion chamber 12 and cooling jacket 14 when the combustion chamber heats during operation of the rocket engine.

In some embodiments, the combustion system 10 shown in FIG. 1 utilizes regenerative cooling, whereby one or both of the propellants 26, typically but not necessary the fuel, flows around the outside of the combustion chamber, between the combustion chamber and the jacket, before it is injected into the chamber for combustion. When both propellants are used for regenerative cooling, a second jacket (not shown) can be used for the second propellant. The combustion chamber 12 includes flow passages 22 (shown in FIGS. 2A-B) in an outer surface 24 of the combustion chamber to facilitate this regenerative cooling. The fuel 26 circulating through these flow passages 22 absorbs heat from the combustion chamber 12 and thereby reduces the temperature of the combustion chamber. The propellants may be liquid, gas, two-phase, or supercritical fluid.

Figure 2A:
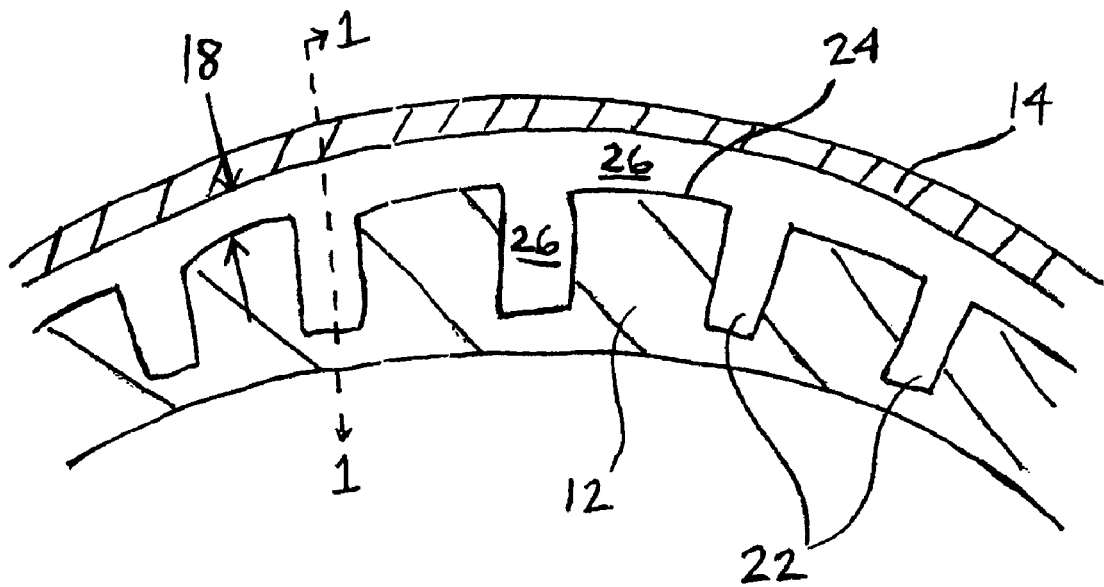
FIG. 2A is a cross-sectional view of a portion of a combustion chamber and cooling jacket, according to some exemplary embodiments of the invention.

The gap 18 between the combustion chamber 12 and cooling jacket 14 exposes these flow passages 22 in the outer surface 24 of the combustion chamber. Before the heat of the combustion process causes the combustion chamber 12 to expand, the gap 18 is open, as shown in FIG. 2A. The fuel 26 can flow both through the flow passages 22 and between these flow passages 22, through the gap 18, as the fuel circulates through the rocket engine to cool the combustion chamber. In one embodiment, the flow passages 22 are approximately 0.058 inches in depth. FIG. 2A shows the combustion system when the engine is not running, or when it has just begun to run and has not fully heated.

Figure 2B:
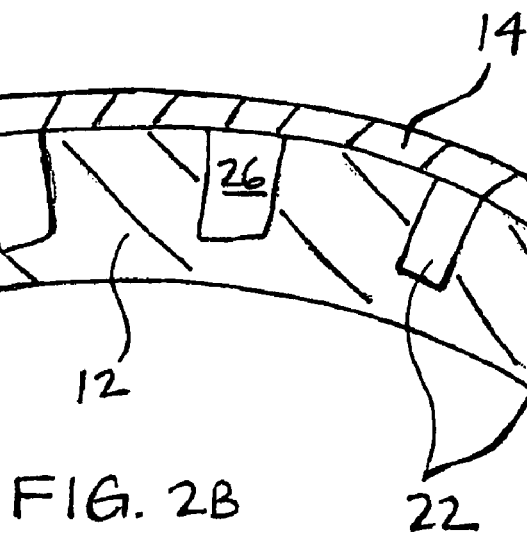
FIG. 2B is a cross-sectional view of the combustion chamber and cooling jacket of FIG. 2A.

When the combustion chamber 12 thermally expands during operation of the rocket engine, it closes the gap 18 and contacts the cooling jacket 14, as shown in FIG. 2B. This contact seals the flow passages 22, confining the fuel 26 to flow through these passages instead of between them. This contact also provides further cooling of the combustion chamber 12 by conducting the heat of the combustion chamber 12 directly to the cooling jacket 14. When the combustion chamber cools down again after operation, it contracts away from the cooling jacket 14, exposing the gap 18 once again. Another enlarged view of the gap 18 and flow passages 22 is shown in FIG. 2C.

The gap 18 thus enables the combustion chamber 12 to expand radially before it contacts the cooling jacket 14. The gap 18 is exaggerated in the figures for clarity, and the actual size of the gap depends on the materials used for the combustion chamber and cooling jacket and their thermal properties. In one embodiment, the gap is 0.002 inches. An added benefit of this gap 18 is increased manufacturing tolerances, as the combustion chamber 12 and cooling jacket 14 do not need to be manufactured to precisely align with each other along the outer surface 24 of the combustion chamber and inner surface 54 of the cooling jacket.

The combustion system 10 also allows for axial expansion of the combustion chamber 12 with respect to the cooling jacket 14. In the embodiments shown in FIG. 1, the combustion chamber 12 and cooling jacket 14 are coupled to an injector 28 at their first ends 30, 32 and are coupled to each other by the piston seal 20 at their second ends 34, 36. The piston seal 20 provides a fluid tight seal that retains the fuel 26 within the flow channels 22 and gap 18, preventing any leaks at the interface between the second ends 34, 36 of the combustion chamber and cooling jacket. The piston seal 20 also allows axial movement between the combustion chamber 12 and the cooling jacket 14. When the combustion chamber 12 heats and expands, the second end 34 of the combustion chamber 12 can move freely with respect to the cooling jacket 14. A bellows is equally acceptable as a piston seal.

In the embodiments shown in FIG. 1, the combustion chamber 12 and cooling jacket 14 are attached or engaged to each other at the injector 28 by a clamp or clamp assembly 38. The combustion chamber 12 and cooling jacket 14 each have shoulders 40, 42, respectively, at or near their first ends 30, 32. The clamp 38 engages the combustion chamber and cooling jacket at these shoulders to clamp them to the injector 28, such as, for example, by clamping them to the fuel plate 46 of the injector 28. The clamp 38 provides some freedom of movement for thermal expansion of the combustion chamber and/or cooling jacket, such as, for example, by including one or more springs 44 or by containing a suitable tailored stiffness that allows the clamp itself to expand. In other embodiments, the combustion chamber and cooling jacket can be attached by welding or brazing rather than clamping them together. A mechanical clamp may be easier to remove for maintenance, but welding or brazing also works. The weld should contain a suitable stiffness to allow the joint to expand.

In the embodiments shown, the combustion chamber 12 includes a main chamber 49 that narrows to a throat 48 that expands into a nozzle 50 through which the combusted propellants 16 are expelled from the rocket engine. The throat 48 creates an annular space 52 between the outer surface 24 of the combustion chamber and the inner surface 54 of the cooling jacket 14. This annular space 52 is occupied by an annular saddle 56 (for clarity, shown on only one side in FIG. 1). Such a saddle prevents the fuel 26 flowing through the flow passages 22 from flowing into the large annular space 52 and keeps the fuel near the outer surface 24 of the combustion chamber. The fuel 26 provides more efficient cooling of the combustion chamber 12 by flowing near the combustion chamber's outer surface 24 than by circulating throughout the annular space 52. The saddle 56 forces the fuel 26 to remain near the combustion chamber's outer surface 24.

The saddle 56 is dimensioned to form a second gap 58 between the saddle and the inner surface 54 of the jacket 14 to allow for thermal expansion of the saddle. The size of this second gap 58 depends on the material properties of the saddle 56. Based on the thermal characteristics of the material that makes up the saddle, including, for example, the coefficient of thermal expansion, the saddle can be sized to leave an appropriate gap 58 into which the saddle can expand as it heats. The gap 58 is often, but not always, larger than the gap 18. The saddle 56 can be manufactured out of metal, plastic, or a combination of materials, such as a plastic core covered by an aluminum shell. When the combustion chamber heats and expands, the saddle can move with it into the gap 58. In the embodiment shown in FIG. 1, the saddle 56 is not attached to the combustion chamber 12 or the jacket 14. It is can be held up against the outside surface 24 of the combustion chamber by an o-ring or other suitable mechanism. When the saddle is held up against the outer surface 24 of the combustion chamber 12, the fuel 26 flowing through the flow passages 22 remains inside the flow passages 22 so that the fuel can provide efficient cooling. While this embodiment does not include any intentional gap formed between the saddle and the combustion chamber, a small gap is acceptable for manufacturing tolerances.

In the embodiments described above, the combustion chamber 12 and cooling jacket 14 are attached to each other and to the injector 28 at their first ends 30, 32. However, in other embodiments, the combustion chamber and cooling jacket are attached together at their second ends 34, 36 or between their first and second ends. The combustion chamber and cooling jacket can be attached at any location along their lengths.

Figure 3:
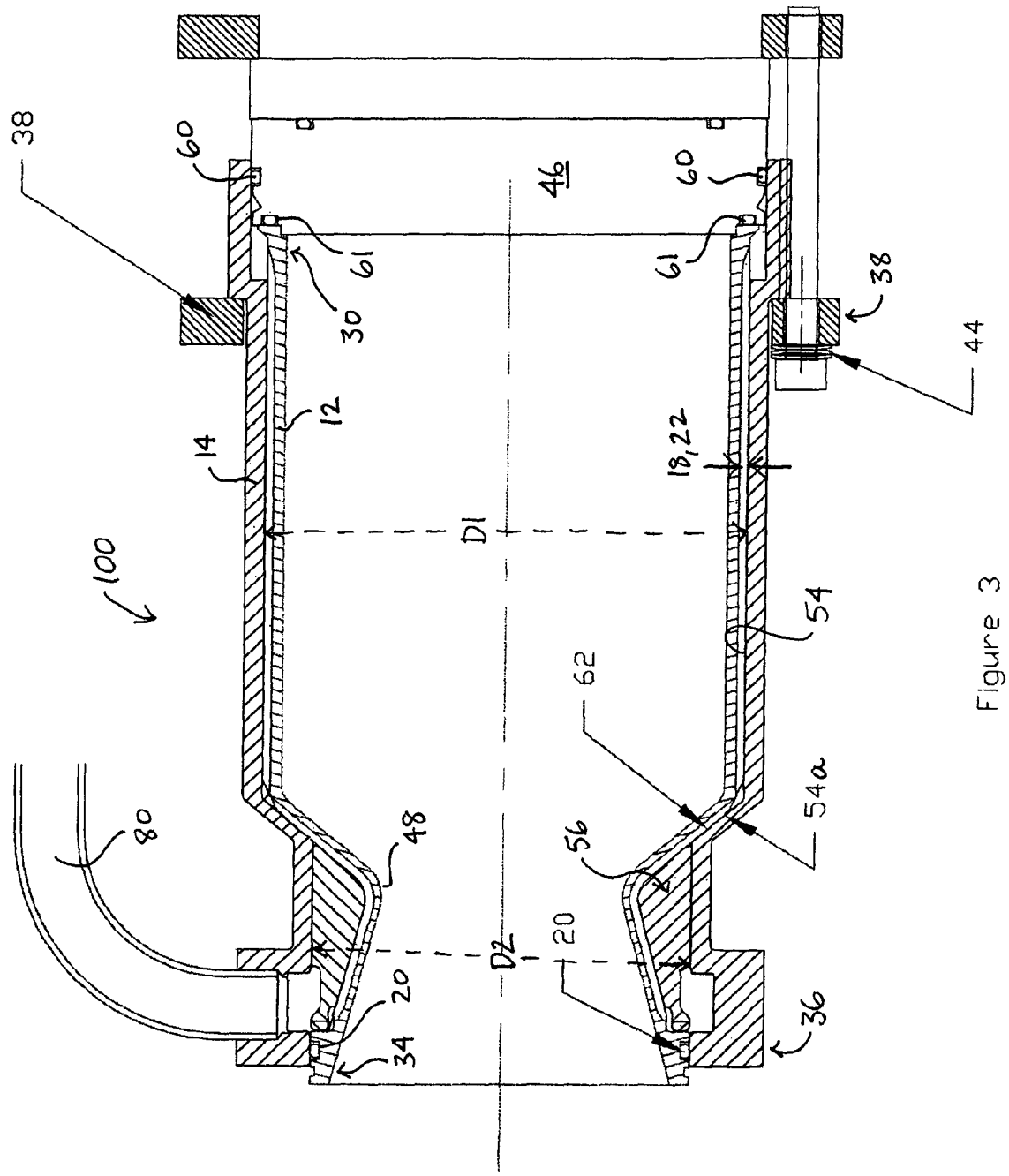
FIG. 3 is cross-sectional side view of a combustion system, according to some exemplary embodiments of the invention.

An exemplary combustion system 100 with a combustion chamber 12 and cooling jacket 14 is shown in FIG. 3. A clamp 38 clamps the cooling jacket 14 to the injector, but the clamp 38 does not engage the combustion chamber 12. A piston seal 60 also couples the jacket 14 to the injector, allowing some axial movement between the two parts. A bellows is equally acceptable as a piston seal.

A face seal 61 couples the combustion chamber 12 to the fuel plate 46 of the injector. This face seal 61 accommodates radial expansion of the combustion chamber 12 with respect to the injector as the chamber heats up during operation. The face seal 61 also provides a fluid seal between the cooling jacket 14 and the injector 28. This seal prevents fuel 26 flowing through flow passages 22 from leaking into the combustion chamber 12 before the fuel passes through the injector 28.

A first piston seal 20 couples the combustion chamber 12 to the cooling jacket 14 at their second ends 34, 36, opposite the injector. Together, the two piston seals 20, 60 allow axial expansion of the combustion chamber 12 with respect to the cooling jacket 14 at both ends 30, 34 of the combustion chamber. The piston seal 20 allows the second end 34 of the combustion chamber 12 to move axially with respect to the jacket 14. The piston seal 60 allows the injector to move axially with respect to the jacket, as the injector expands axially with the combustion chamber.

In the embodiments of FIG. 3, the combustion chamber 12 is coupled to the cooling jacket 14 between the combustion chamber's two ends 30, 34. The cooling jacket 14 is shaped to retain the combustion chamber 12 inside the cooling jacket 14, even though the two are not clamped or attached together at either end. The cooling jacket 14 includes a slanted surface or step 54a where the inner surface 54 of the cooling jacket narrows from a first diameter D1 to a smaller diameter D2. The step 54a abuts against the combustion chamber 12 at an outer surface 62 of the combustion chamber, where the combustion chamber begins to narrow into the throat 48. The combustion chamber 12 mates with or engages the cooling jacket 14 at the contact between the step 54a and the surface 62.

The piston seals 20, 60 allow the combustion chamber 12 to expand axially with respect to the cooling jacket 14 at either end 30, 34 of the combustion chamber. The combustion chamber is coupled to the cooling jacket at the contact between the step 54a and surface 62, where the combustion chamber and cooling jacket abut against each other. The compression between these two surfaces retains the combustion chamber with the cooling jacket, while the piston seals 20, 60 allow axial expansion between the combustion chamber and cooling jacket. As the surfaces 54a, 62 are compressed against each other, the clamp 38 is in tension.

At the contact between the surfaces 54a and 62, there is no gap 18 that allows radial expansion. The gap 18 is formed at the other interfaces between the combustion chamber and cooling jacket, to allow radial expansion. At the contact between the surfaces 54a and 62, the combustion chamber and cooling jacket directly contact each other, although they need not be welded or otherwise fused together.

Thus, in the embodiments shown in FIG. 3, the combustion chamber 12 is effectively clamped to the cooling jacket 14 at the interface 54a, 62, instead of at its first end 30 (as shown in FIG. 1). Although the surfaces 54a, 62 are shown contacting each other near the throat 48, they could be located at any point along the lengths of the combustion chamber and cooling jacket.

Figure 4:
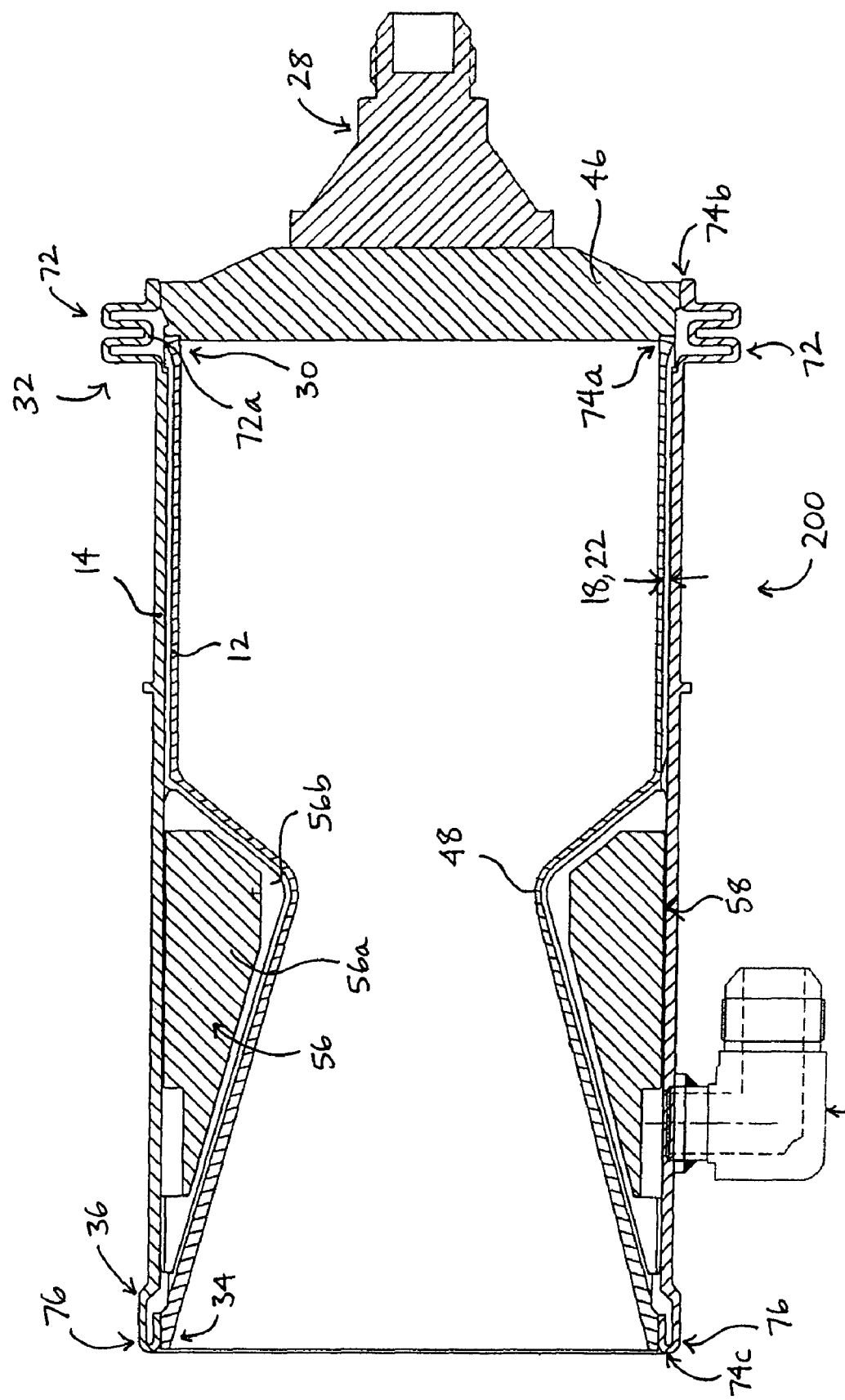
FIG. 4 is a cross-sectional side view of a combustion system, according to some exemplary embodiments of the invention.

A combustion system 200 having a combustion chamber 12 and cooling jacket 14 is shown in FIG. 4. The combustion chamber 12 is welded or brazed to the cooling jacket 14 at their second ends 34, 36, at the welded or brazed joint 76. This welded or brazed joint 76 can be used as an alternative to a clamp assembly, such as the one shown in FIG. 1. The welded or brazed joint 76 allows a small amount of radial expansion of the combustion chamber 12 with respect to the cooling jacket 14.

The first end 30 of the combustion chamber 12 is attached to the fuel plate 46 of the injector 28 at a welded or brazed joint 74a. The first end 32 of the cooling jacket 14 forms a bellows 72 that is attached to the injector 28 at the welded or brazed joint 74b. The bellows 72 allows axial expansion of the cooling jacket 14 with respect to the combustion chamber 12. The amount of axial expansion allowed by the bellows 72 is proportional to the number of folds or shoulders 72a formed in the bellows 72. Each fold 72a provides the bellows 72 with some added flexibility so that the bellows 72 can expand. Greater or lesser axial expansion can be obtained by using more or fewer folds 72a. In these embodiments, the combustion chamber 12 can expand radially due to the gap 18 between it and the cooling jacket, and can expand axially due to the bellows 72.

The saddle 56 includes the saddle 56b and a saddle insert 56a. The saddle 56b is a metallic material, such as aluminum, and the saddle insert 56a is a plastic material. The saddle insert 56a is used to reduce the overall weight of the rocket engine, as the entire saddle 56 is not made of high density metal. Instead, only the portion of the saddle facing the combustion chamber, the saddle 56b, is made of metal, and the rest, the saddle insert 56a, is made of a lower density plastic to reduce weight.

As these embodiments demonstrate, the cooling jacket 14 and combustion chamber 12 can be coupled together at any location along their lengths. They may be clamped, welded, or brazed together at the injector (as shown in FIG. 1), at the exit of the nozzle (as shown in FIG. 4), or somewhere between (as shown in FIG. 3). The use of piston seals or bellows at the first and/or second ends of the combustion chamber allows the chamber to expand thermally without being constrained by the cooling jacket. In contrast, when the combustion chamber is clamped to the cooling jacket at two different locations, then the chamber's thermal expansion is constrained between those two clamps. The chamber is only able to expand as much as the tailored stiffness or springs of the clamps can tolerate. For small combustion chambers, the tailored stiffness or springs in the clamp may be sufficient, as they may allow enough free movement of the combustion chamber to accommodate its thermal expansion. However, larger combustion chambers can expand more than the clamp allows. The piston seal and gap provided in the present invention allow that expansion and reduce the thermal stresses in the combustion chamber.

The detailed description set forth above in connection with the appended drawings is intended as a description of embodiments of a combustion system provided in accordance with the present invention and is not intended to represent the only forms in which the present invention may be constructed or utilized. Many modifications and variations will be apparent to those skilled in the art. Accordingly, it is to be understood that the combustion system constructed according to principles of this invention may be embodied other than as specifically described herein. The invention is also defined in the following claims.

What is claimed is:

1. A combustion system for a rocket engine comprising:
an injector;

a combustion chamber comprising a main chamber for combusting a propellant;

a jacket coupled to the combustion chamber and coupled to the injector, wherein an outer surface of the combustion chamber at the main chamber faces an inner surface of the jacket;

a plurality of flow channels in the outer surface of the combustion chamber at the main chamber, the flow channels dimensioned for flow of such propellant through the flow channels to cool the combustion chamber; and an annular gap between the inner surface of the jacket and the outer surface of the combustion chamber, for allowing radial expansion of the combustion chamber with respect to the jacket, the annular gap being dimensioned to substantially close during such radial expansion of the combustion chamber.

2. The combustion system of claim 1, further comprising means for allowing axial expansion of the combustion chamber with respect to the jacket.

3. The combustion system of claim 2, wherein the means for allowing axial expansion comprises a clamp clamping a first end of the combustion chamber to the jacket, and a piston seal coupling a second end of the combustion chamber to the jacket.

4. The combustion system of claim 2, wherein the means for allowing axial expansion comprises at least one of a piston seal or a bellows coupling a first end of the jacket to the injector.

5. The combustion system of claim 2, wherein the means for allowing axial expansion comprises a first piston seal coupling a first end of the jacket to the injector, and a second piston seal coupling a second end of the combustion chamber to the jacket, and a step on the inside surface of the jacket contacting an outer surface of the combustion chamber between the first and second piston seals.

6. A combustion system for a rocket engine comprising:
an injector;
a combustion chamber;
a jacket coupled to the combustion chamber to form an annular gap therebetween, and coupled to the injector;
a plurality of fuel flow channels in an outer surface of the combustion chamber facing an inner surface of the jacket, the fuel flow channels receiving a flow of fuel through the channels to cool the combustion chamber; and means for allowing axial expansion of the combustion chamber with respect to the jacket, wherein the fuel flow channels comprise grooves formed in the outer surface of the combustion chamber.

7. The combustion system of claim 6, wherein the means for allowing axial expansion comprises a piston seal coupling the jacket to the combustion chamber.

8. The combustion chamber of claim 6, wherein the means for allowing axial expansion comprises a piston seal coupling the jacket to the injector.

9. The combustion chamber of claim 6, wherein the means for allowing axial expansion comprises a bellows coupling the jacket to the injector.

10. A rocket engine comprising:
a combustion chamber having an inner surface and an outer surface;
a plurality of flow passages in the outer surface of the combustion chamber;
a jacket encircling the combustion chamber, the jacket having an inner surface and an outer surface and forming a gap between the inner surface of the jacket and the outer surface of the combustion chamber;
a clamp clamping a first end of the jacket to a first end of the combustion chamber; and
a piston seal coupling a second end of the jacket to a second end of the combustion chamber, wherein the piston seal is configured to allow movement between the second end of the jacket and the second end of the combustion chamber, and
wherein the gap is configured to close during operation of the rocket engine.

11. The combustion system of claim 1, wherein the outer surface of the combustion chamber contacts the inner surface of the jacket and seals the flow channels when the annular gap is closed.

12. The combustion system of claim 1, wherein the flow channels and the annular gap are sealed between the combustion chamber and the jacket for preventing fluid leaks.

13. The combustion system of claim 1, wherein the combustion chamber comprises a throat forming an annular space between the combustion chamber and the jacket, and wherein a saddle occupies the annular space.

* * * * *